Figure 1:
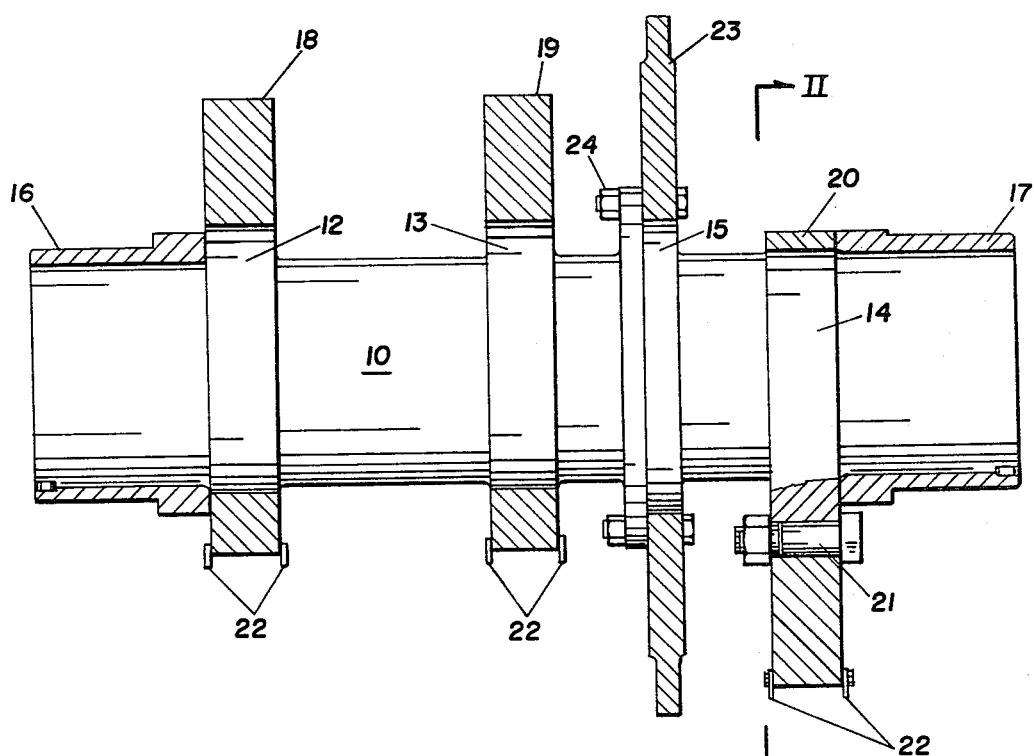

United States Patent [19]

Makins, Jr.

[11] 4,231,671
[45] Nov. 4, 1980

[54] ECCENTRIC SHAFT AND METHOD OF MAKING A SHAFT

[75] Inventor: James E. Makins, Jr., Dallas, Tex.

[73] Assignee: United States Steel Corporation, Pittsburgh, Pa.

[21] Appl. No.: 958,458

[22] Filed: Nov. 6, 1978

[51] Int. Cl.³ .................................................. F16B 3/00
[52] U.S. Cl. ..................................... 403/13; 403/273; 403/358
[58] Field of Search ............... 403/273, 356, 358, 360, 403/26, 13; 74/570, 571 R, 571 M

[56] References Cited

U.S. PATENT DOCUMENTS

| | | | |
|---|---|---|---|
| 95,174 | 9/1869 | Wells | 74/571 R |
| 137,441 | 4/1873 | Haskins | 74/570 |
| 1,196,089 | 8/1916 | Dearborn | 403/358 X |
| 1,277,420 | 9/1918 | Human | 74/570 UX |
| 2,101,956 | 12/1937 | Sailstad | 74/570 |
| 2,157,838 | 5/1939 | Warner | 403/273 |
| 2,348,958 | 5/1944 | Celio | 74/571 R |
| 2,370,760 | 3/1945 | Towler et al. | 74/570 |

Primary Examiner—Andrew V. Kundrat
Attorney, Agent, or Firm—Walter P. Wood

[57] ABSTRACT

An eccentric shaft particularly for driving a large reciprocating pump, and a method of making the shaft. The shaft includes an elongated cylindrical body, a plurality of small eccentric discs uniformly spaced along the length of the body, and optionally one or more concentric gear flanges, all formed as a single integral forging. Relatively large eccentric discs are shrink-fitted and keyed to the small eccentric discs.

3 Claims, 2 Drawing Figures

ECCENTRIC SHAFT AND METHOD OF MAKING A SHAFT

This invention relates to an improved eccentric shaft and to an improved method of making an eccentric shaft.

Although the invention is not thus limited, the shaft is particularly useful for driving large multiple-cylinder reciprocating pumps. Such pumps have a crankshaft or an eccentric shaft usually formed as a casting or a weldment. The crankpins or eccentric discs carry roller bearings on which connecting rods are pivoted leading to crossheads and to the reciprocating elements of the pump. Because of design limitations in the roller bearings, the diameter of the crankpins or eccentric discs must be rather larger in relation to the crank radius of the shaft. Known cast constructions are complex, and it is difficult to obtain castings free of defects. Materials which are readily cast do not have the strength obtainable in forged materials. Construction of these shafts as weldments has not been particularly successful because of difficulties in designing and producing welds which survive the high-cyle rate fatigue loading.

An object of the present invention is to provide an improved eccentric shaft and method of making the shaft in which the shaft body and small eccentric discs are formed as a single integral forging, and larger eccentric discs are shrink-fitted in a critical relation on the small eccentric discs.

A further object is to provide an improved forged eccentric shaft and method in which the shaft body, small eccentric discs, and optionally one or more gear flanges are formed as a single integral forging, and relatively large eccentric discs are shrink-fitted and keyed to the small eccentric discs, the only torques transmitted by the shrink-fits being the small torques due to friction in the connecting rod bearings, the keys being free of torque as long as the shrink-fits are maintained.

Figure 2:
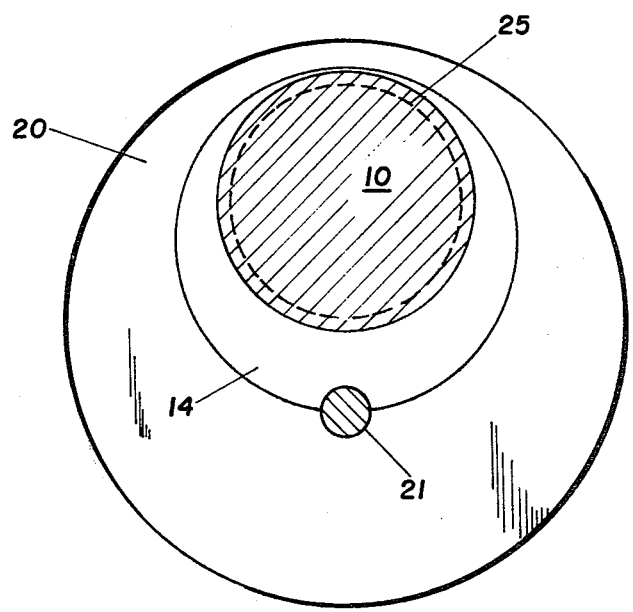

In the drawing:

FIG. 1 is a side elevational view, partly in section of an eccentric shaft constructed in accordance with the invention; and FIG. 2 is a cross-sectional view on a larger scale on line II of FIG. 1.

The drawing shows, by way of example, an eccentric shaft suitable for use in a large triplex pump. The shaft includes an elongated cylindrical body 10, a plurality of small eccentric discs 12, 13 and 14 extending radially from the body, and a relatively small diameter concentric gear flange 15, all formed as a single integral forging. The eccentric discs are spaced uniformly along the length of the shaft body and in the illustration the gear flange lies between discs 13 and 14. Sleeves 16 and 17 are fitted over the end portions of the shaft body outboard of the outermost discs 12 and 14 to be journaled in suitable bearings (not shown), and thus supporting the shaft for rotation on its longitudinal axis.

Relatively large eccentric discs 18, 19 and 20 are shrink-fitted on the small eccentric discs 12, 13 and 14 respectively. Bolts 21 extend through cutouts in the mating circumferential edges of the large and small discs to key the large discs to the small discs. At their outer circumferences the large discs carry retainers 22 for roller bearings (not shown) on which the connecting rods are pivoted. A driving gear carrier 23 is affixed to the gear flange 15, as with bolts 24. The gear flange and drive gear are omitted if the shaft is driven by other means. Other shafts may have more than one gear flange and drive gear.

FIG. 2 shows the relation between the diameters of discs 14 and 20. The relation is similar at the other discs. The path which the center of the larger disc 20 describes as the shaft rotates is referred to as the "crank circle" and is indicated at 25. According to the invention the crank circle lies entirely within the small disc 14. The connecting rod load acts through the crank circle. As a consequence of the foregoing relation, the only torque transmitted through the shrink-fit is the small torque due to internal friction in the connecting rod bearings. As long as the shrink-fit is maintained, the bolt or key 21 transmits no torque, but serves only to locate the larger disc circumferentially with respect to the small disc.

From the foregoing description, it is seen that my invention provides an eccentric shaft of simple construction, preferably formed of a high-strength high-integrity forged alloy steel. The shaft easily can be inspected for defects by ultrasonic or other non-destructive methods. Shrink-fitting of the large eccentric discs eliminates any need for welding. Locating the key in the small disc eliminates stress concentration in the shaft as would be present if the large discs were keyed directly to the shaft.

I claim:

1. An eccentric shaft comprising an elongated cylindrical body, at least one small eccentric disc extending radially from said body, at least one concentric gear flange extending radially from said body, said body, disc and flange being formed as a single integral forging, and a relatively large eccentric disc shrink-fitted and keyed to said small disc, the diameters of said discs being related that the center of said large disc describes a crank circle entirely within said small disc on rotation of said shaft.

2. A shaft as defined in claim 1 in which there are a plurality of said small discs spaced uniformly along the length of said shaft, and a corresponding member of large discs shrink-fitted and keyed to the small disc, said gear flange being located between two of said small discs.

3. A shaft as defined in claim 1 comprising in addition bearing retainers at the outer circumference of said large disc, the only torque on the shrink-fit being internal friction of bearings mounted in said retainers.

* * * * *